Jan. 30, 1968  R. L. BERRY  3,365,896
LOW TEMPERATURE REFRIGERATING ARRANGEMENT
Filed March 4, 1966

INVENTOR.
ROBERT L. BERRY,
BY
ATTORNEY.

United States Patent Office 3,365,896
Patented Jan. 30, 1968

3,365,896
LOW TEMPERATURE REFRIGERATING
ARRANGEMENT
Robert L. Berry, Palos Verdes, Calif., assignor to Hughes
Aircraft Company, Culver City, Calif., a corporation of
Delaware
Filed Mar. 4, 1966, Ser. No. 531,823
2 Claims. (Cl. 62—6)

ABSTRACT OF THE DISCLOSURE

A pair of cylinder piston devices are provided reciprocating 180° out of phase. Two sources of warm high pressure helium are provided, each source communicating with one of the cylinder piston devices. Conduits establish the noted communication and segments of each conduit are positioned in a heat exchanger in thermal transfer relation. Optionally, valves may be provided in the conduit to control helium flow. Helium flow from the sources to the respective cylinder piston devices is counterflow, that is, while the gas is entering one device it is leaving the other device. Expansion of the gas in the piston produces cooling effect. The cold gas leaving one piston is warmed by and in turn pre-cools the warm gas entering the other piston at the heat exchanger.

---

Figure 1:
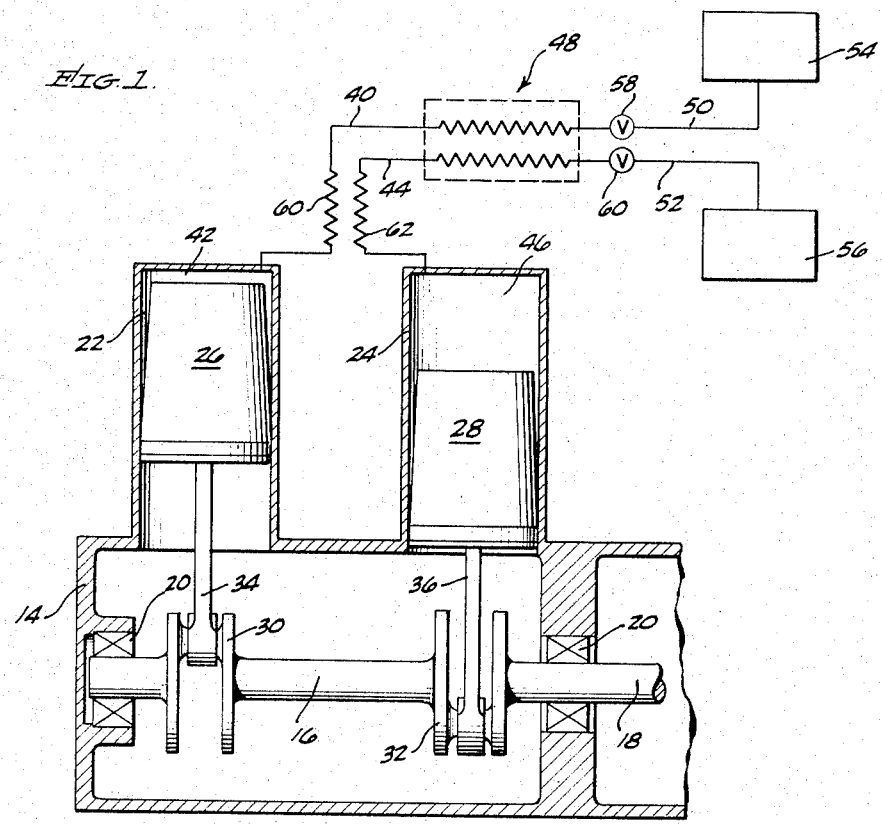

The invention relates to a mode of expansion of a cryogenic gas in combination with a regenerating arrangement that is particularly adapted to produce refrigeration at extremely low cryogenic temperatures.

Recently developed technology such as infrared detector cooling, parametric amplifier cooling or the cooling of superconducting circuits has made it desirable to produce equipment capable of providing refrigeration below 10° Kelvin and frequently as low as approximately 4° K. One practice has been to utilize cascaded Joule-Thompson cryostats when temperatures to these levels are required. Characteristically, these prior art devices are expensive and somewhat cumbersome in construction and operation. Efficiency has been sacrificed to achieve the desired temperature levels.

In another design area, small refrigerators have been produced which operatively interconnect a compressor and an expansion cylinder and employ what is known in the art as closed Stirling, Solvay and Claude cycles, and their derivatives. These machines tend to provide more efficient low temperature refrigeration than the Joule-Thompson unit noted above. As is well known, engines using the Stirling or Solvay cycle and their derivatives employ, in the transfer of a gas between the compression cylinder and expansion cylinder, regenerating devices through which the transferred gas is passed and which, characteristically, absorb heat from the gas at it moves to the expansion chamber delivering the gas at that chamber at a relatively low temperature. On the return phase of the cycle the cool gas again passes through the regenerator absorbing the heat stored therein and the gas is delivered to the compression chamber at a relatively high temperature. The regenerator, therefore, has the capacity to absorb heat from a passing gas, retain same in a stored condition and deposit the heat to the gas as it is reversely cycled therethrough.

The regenerating devices of the prior art usually employed cylinders or other chambers having opposed gas ports and having contained therein such materials as steel wool, stainless steel shavings, or in some instances small lead balls or pebbles. A practical difficulty has arisen in the operation of such equipment in that it has been found that the specific heat of the mentioned metallic materials approaches zero as low cryogenic temperature levels are encountered. As a result, they are unable to absorb the heat energy required without extremely high temperature variation. The practical effect of this phenomenon is that units incorporating such devices are limited in the refrigerating effect that they can produce. It has been found, for example, that with lead ball regenerators, generally the most efficient at cryogenic temperatures approaching absolute zero, the practical refrigerating limit is approximately 10° K. Usually, attempts at lower refrigerating temperatures are frustrated by inefficient regenerator operation. Attempts to evade this practical limitation by enlarging expansion and compressor cylinders and thus provide more refrigeration have proved ineffectual. Additionally, weight, size and cost are important considerations in many service applications and further discourage machine enlargement.

It is therefore a primary object of the invention to provide an efficient, compact, comparatively inexpensive arrangement capable of producing refrigeration in the cryogenic range and below 10° K.

It is another object of the invention to provide an arrangement which utilizes specific heat of a gas which is fairly constant in relation to temperature at extremely low temperature levels and thereby create a capacity to produce the desired refrigeration.

Specifically, the invention incorporates a pair of expansion devices such as cylinder-piston arrangement operating approximately 180° out of phase. Each device communicates with a source of warm working fluid, such as helium gas, under pressure. The cylinder piston devices are utilized as expansion chambers to allow the working fluid to expand and cool to the desired temperature level and thus produce the refrigerating effect. Of course, in giving up heat, the working fluid delivers usable output work to the pistons. Additionally, the invention incorporates a counter-flow heat exchanger operatively arranged so that a heat transfer mode exists between the working fluid delivery lines communicating with the respective devices. Thus a regenerating effect is produced. Of course, the expansion devices creating the refrigeration may be in thermal transfer relation with an appropriate heat load such as the infrared detector or parametric amplifier mentioned.

Figure 2:
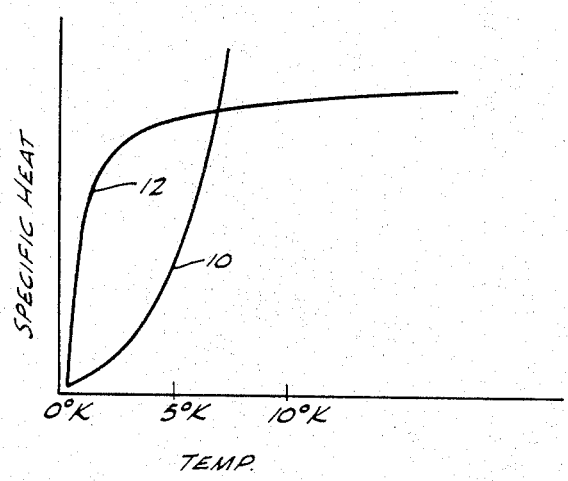

These and other features and advantages of the invention will be more clearly understood by reference to the following specification and the related drawing, wherein:

FIG. 1 is a fragmentary partially schematic elevational view of an apparatus incorporating the invention; and FIG. 2 is a specific heat-temperature diagram for a typical gas used in the invention.

Describing the arrangement in detail and directing attention to FIG. 2, it will be noted that the ordinate of the graph represents specific heat variation while the abscissa represents temperature change beginning 0° K. or absolute zero. The curve indicated at 10 represents a typical plot of specific heat variation in relation to temperature change for most metallic elements utilized in regenerators, for example, the steel wool, stainless steel shavings and lead balls mentioned. It will be apparent that as the temperature level approaches absolute zero minor changes in temperature result in substantial reduction in the specific heat of the material. It is this physical fact that prevents existent prior art refrigerators from producing the cryogenic temperature ranges desired, i.e., below 10° K. and even reduces efficiency at higher temperature levels.

The numeral 12 represents a typical plot of specific heat variation vs. temperature for a cryogenic gas, such as helium. It will be noted that the curve 12 levels off substantially in the 2 to 3° K. range and a rather marked temperature change may occur in this area without a substantial change and specific heat. It will be apparent that the specific heat of helium within the 4 to 10° K. range and somewhat above is relatively constant. The curves as they typically appear at higher temperatures are not shown as being germane to this disclosure.

Considering FIG. 1, it will be seen that a crankcase housing 14 is provided having a rotatable crankshaft 16 therein, the latter having an exposed end 18 which may be conventionally connected (not shown) to any work absorbing device such as driving an electrical generator or alternator. Appropriate bearings 20, 20 accommodate the rotation desired. A pair of cylinders 22 and 24 are integrally formed with the housing 14 and have disposed therein pistons 26 and 28. The crankshaft 16 is provided with eccentric throws 30 and 32 formed at 180° out-of-phase relationship. The throw 30 is connected to piston 26 by connecting rod 34 and the throw 32 is connected to piston 28 by connecting rod 36. Thus, the pistons 26 and 28 will reciprocate within the respective cylinders in out-of-phase fashion.

A first gas line 40 is provided and communicates with chamber 42 defined by cylinder 22 and piston 26. A second gas line 44 communicates with chamber 46 defined by cylinder 25 and piston 28. The lines 40 and 44, at one segment therein, are respectively encapsulated in a counterflow heat exchange device indicated generally at 48. Opposed ends of the lines 40 and 44, namely 50 and 52, communicate with relatively high pressure sources of cryogenic gas indicated diagrammatically at 54 and 56. It will be understood that the sources 54 and 56 may be any conventional type such as compressors or tanks acting as accumulators. Additionally, automatic valves 58 and 60 may be provided in the respective lines. However, as will hereinafter be explained, the valving 58 and 60 is not, per se, necessary to invention operation.

It will be understood that the construction of the counter-flow regenerator 48 is such that the gas passing through the respective lines 40 and 44 are in thermal transfer relation therein so that heat may be transferred between the gas in the reflective lines as hereinafter explained.

In operation, and assuming piston 26 is at top dead center as illustrated and piston 28 is at bottom dead center as illustrated, as piston 26 moves downwardly piston 28 will concurrently move upwardly. With downward movement of piston 26, relatively warm high pressure helium gas enters line 50 from source 54 and is carried through heat exchanger 48. Concurrently, gas within chamber 46, and at a relatively low pressure and temperature, is forced from chamber 46 by advancing piston 28 and enters the heat exchanger 48 in reverse directional flow from that gas moving to chamber 42. Within exchanger 48 the incoming gas in line 40 is cooled while the existing gas in line 44 is warmed. As the pistons 26 and 28 approach midpoint in their strokes, gas flow in lines 50 and 52 substantially ceases and the gas in chamber 42 continuously expands and cools as piston 26 moves to bottom dead center and the low pressure cooled gas in chamber 46 is compressed and forced into line 44 and heat exchanger 48.

It is not absolutely necessary that the flow in lines 50 and 52 be stopped at this point. However, it is generally desirable to do so and valves 58 and 60 are employed. In a machine using valves the flow can be controlled directly by opening and closing the valves as required. In a valveless machine, for example, one employing a conventional cylinder-piston compressor which serves a high pressure gas source, the flow may be controlled by varying the magnitude of the out-of-phase relationship between the compression piston and the expansion piston, or varying the relative sizes of the compressor and expansion pistons, or both.

As piston 28 reaches top dead center position, piston 26 concurrently arrives at bottom dead center position. As piston 28 starts downwardly, high pressure relatively warm gas enters line 52 from source 56 and is drawn through the heat exchanger 48 and into chamber 46. Concurrently, piston 26 is moved upwardly, forcing cold relatively low pressure gas through heat exchanger 48. Again and as a result of the counter-flow in the exchanger 48, the incoming warm high pressure gas is cooled in line 44 and the cold low pressure gas is warmed as it passes from line 40. The flow continues until pistons reach approximately midpoint in their stroke whereat flow substantially ceases and expansion and cooling occurs in chamber 46 while the relatively cool low pressure in chamber 42 is forced into the heat exchanger 48. As the cycles are continuously repeated lower and lower refrigerating temperatures are achieved at cylinders 22 and 24. Regeneration of the gas is totally accomplished within the exchanger 48 and results from thermal transfer between volumes of the gas being used to achieve the refrigerating effect.

It will be understood, therefore, that on each stroke refrigeration is being produced either at cylinder 22 or cylinder 24 and that the cycle is continuous and alternating. The refrigeration may be utilized in any manner as described above, for example, to cooling heat load indicated schematically at 60 and 62, lines 40 and 44.

Normally, as the pistons 26 and 28 reach the midpoint of their respective strokes, gas flow in line 40 and 44 is minimal. If it is desired to completely halt gas flow at any point in the operation cycle, valves 58 and 60 may be conventionally and selectively opened and closed to produce any flow pattern desired.

It has been found that the invention provides a small expansion type refrigerating unit capable of cooling a heat load of up to about 10 watts at extremely low cryogenic temperatures, for example, within the 5 to 10° K. range. It may be utilized with Stirling, Solvay, or their derivative cycles and if desired could be arranged in series or cascaded with a Joule-Thompson cryostat to provide even lower cryogenic temperatures. This is due to the design's ability to pre-cool to such an extremely low level. The load capability of the arrangement is not dependent upon temperature except one inherent limitation, namely, the point at which the working fluid liquefies at a given pressure. The device embodying the invention is particularly designed to operate at relatively low pressures, namely, in the 2½ to 5 atmosphere range when helium is the working fluid and delivers desired refrigeration in an efficient manner. Additionally, the design affords a greater degree of miniaturization than prior art arrangements, a feature of major importance in many current service applications.

The invention as described is by way of illustration and not limitation and may be modified all within the scope of the appended claims.

What is claimed is:

1. In a device for providing refrigeration at cryogenic temperature levels,
a first and second source of high-pressure warm helium gas,
a first and second cylinder piston arrangement,
conduit means establishing communication between the first source and the first cylinder piston arrangement and the second source and the second cylinder piston arrangement respectively,
said conduit means including heat exchange means to accommodate thermal transfer between the respective conduit means,
crank means to reciprocate the pistons within each arrangement at 180° out-of-phase relation,
heat load means associated with the arrangements,
the reciprocation of said pistons producing counter-flow transfer of the helium from the respective sources to the respective devices and alternate expansion of the helium within each cylinder arrangement to create a cooling effect for the heat load means, said counterflow transfer of the helium being effective to cool helium gas entering one of the devices and warm helium gas leaving the other device.

2. A device for providing refrigeration at cryogenic temperature levels according to claim 1, and including, valve means in the respective conduit means to limit flow of helium in the respective conduit means to one-half the stroke cycle of the piston in the respective devices.

References Cited

UNITED STATES PATENTS

| | | | |
|---|---|---|---|
| 3,145,527 | 8/1964 | Morgenroth | 62—6 |
| 3,183,662 | 5/1965 | Korsgren | 62—6 |
| 3,188,822 | 6/1965 | Daunt | 62—6 |
| 3,260,055 | 7/1966 | Webb | 62—6 |
| 3,310,954 | 3/1967 | Sijtstra et al. | 62—6 |
| 3,312,072 | 4/1967 | Gifford | 62—6 |

LLOYD L. KING, *Primary Examiner.*